(12) United States Patent  (10) Patent No.: US 8,675,912 B2
Caduff  (45) Date of Patent: Mar. 18, 2014

(54) SYSTEM AND METHOD FOR INITIATING ACTIONS AND PROVIDING FEEDBACK BY POINTING AT OBJECT OF INTEREST

(75) Inventor: David Caduff, Degen (CH)

(73) Assignee: Ipointer, Inc., Bakersfield, CA (US)

( * ) Notice: Subject to any disclaimer, the term of this patent is extended or adjusted under 35 U.S.C. 154(b) by 462 days.

(21) Appl. No.: 12/645,231

(22) Filed: Dec. 22, 2009

(65) Prior Publication Data

US 2010/0303339 A1  Dec. 2, 2010

Related U.S. Application Data

(60) Provisional application No. 61/139,843, filed on Dec. 22, 2008.

(51) Int. Cl.
*G06K 9/00* (2006.01)
(52) U.S. Cl.
USPC .......................................... 382/103; 382/154
(58) Field of Classification Search
USPC ................................. 382/154, 103
See application file for complete search history.

(56) References Cited

U.S. PATENT DOCUMENTS

| | | | |
|---|---|---|---|
| 5,214,757 A | 5/1993 | Mauney et al. | |
| 5,470,233 A | 11/1995 | Fruchterman et al. | |
| 5,592,382 A | 1/1997 | Colley | |
| 5,628,050 A | 5/1997 | McGraw et al. | |
| 5,633,946 A | 5/1997 | Lachinski et al. | |
| 5,745,113 A | 4/1998 | Jordan et al. | |
| 5,771,169 A | 6/1998 | Wendte | |
| 5,848,373 A | 12/1998 | DeLorme et al. | |
| 6,070,167 A | 5/2000 | Qian et al. | |
| 6,144,318 A | 11/2000 | Hayashi et al. | |
| 6,173,239 B1 | 1/2001 | Ellenby | |
| 6,222,482 B1 | 4/2001 | Gueziec | |
| 6,247,019 B1 | 6/2001 | Davies | |
| 6,262,741 B1 | 7/2001 | Davies | |
| 6,282,362 B1 | 8/2001 | Murphy et al. | |
| 6,334,087 B1 | 12/2001 | Nakano et al. | |
| 6,381,540 B1 | 4/2002 | Beason et al. | |

(Continued)

FOREIGN PATENT DOCUMENTS

EP  2154481 A1  2/2010
JP  2008158583 A  7/2008

(Continued)

OTHER PUBLICATIONS

Hosoya et al., "Arm-pointer: 3D pointing interface for real-world interaction", International Workshop on Human-Computer Interaction, Lecture Notes in Computer Science, vol. 3058, Springer (2004) pp. 70-80, 2004.*

(Continued)

*Primary Examiner* — Anand Bhatnagar
*Assistant Examiner* — Soo Park
(74) *Attorney, Agent, or Firm* — Wilmer Cutler Pickering Hale and Dorr LLP (57) ABSTRACT

A system and method as described for compiling feedback in command statements that relate to applications or services associated with spatial objects or features, pointing at such spatial object or feature order to identify the object of interest, and executing the command statements on a system server and attaching feedback information to their representation of this object or feature in a database of the system server.

28 Claims, 6 Drawing Sheets

(56) References Cited

U.S. PATENT DOCUMENTS

| | | | |
|---|---|---|---|
| 6,385,541 B1 | 5/2002 | Blumberg et al. | |
| 6,456,938 B1 | 9/2002 | Barnard | |
| 6,486,831 B1 | 11/2002 | Martorana et al. | |
| 6,496,776 B1 | 12/2002 | Blumberg et al. | |
| 6,504,541 B1 | 1/2003 | Liu et al. | |
| 6,532,304 B1 | 3/2003 | Liu et al. | |
| 6,606,542 B2 | 8/2003 | Hauwiller et al. | |
| 6,708,109 B1 | 3/2004 | Pradhan et al. | |
| 6,732,120 B1 | 5/2004 | Du | |
| 6,795,768 B2 | 9/2004 | Bragansa et al. | |
| 6,799,115 B1 | 9/2004 | Childs et al. | |
| 6,847,883 B1 | 1/2005 | Walmsley et al. | |
| 6,879,838 B2 | 4/2005 | Rankin et al. | |
| 6,912,545 B1 | 6/2005 | Lundy et al. | |
| 6,930,715 B1 | 8/2005 | Mower | |
| 6,965,828 B2 | 11/2005 | Pollard | |
| 6,982,697 B2 | 1/2006 | Wilson et al. | |
| 6,983,202 B2 | 1/2006 | Sanqunetti | |
| 7,003,136 B1 | 2/2006 | Harville | |
| 7,031,875 B2 | 4/2006 | Ellenby et al. | |
| 7,072,665 B1 | 7/2006 | Blumberg et al. | |
| 7,174,301 B2 | 2/2007 | Florance et al. | |
| 7,245,923 B2 | 7/2007 | Frank et al. | |
| 7,295,922 B2 | 11/2007 | Simon Robert et al. | |
| 7,418,341 B2 | 8/2008 | Wuersch et al. | |
| 7,991,283 B2 | 8/2011 | Chen et al. | |
| 8,160,400 B2 | 4/2012 | Snavely et al. | |
| 2001/0044309 A1 | 11/2001 | Bar et al. | |
| 2002/0140745 A1 | 10/2002 | Ellenby et al. | |
| 2002/0155844 A1 | 10/2002 | Rankin et al. | |
| 2002/0165662 A1 | 11/2002 | Maruyama et al. | |
| 2002/0171586 A1 | 11/2002 | Martorana et al. | |
| 2003/0083063 A1 | 5/2003 | Wang et al. | |
| 2003/0149557 A1 | 8/2003 | Cox et al. | |
| 2004/0002303 A1 | 1/2004 | Hirokawa | |
| 2004/0021780 A1 | 2/2004 | Kogan | |
| 2004/0024522 A1 | 2/2004 | Walker et al. | |
| 2004/0078278 A1 | 4/2004 | Dauga et al. | |
| 2004/0087294 A1 | 5/2004 | Wang | |
| 2004/0145591 A1 | 7/2004 | Luo et al. | |
| 2005/0075119 A1 | 4/2005 | Sheha et al. | |
| 2005/0108646 A1 | 5/2005 | Willins et al. | |
| 2005/0125145 A1 | 6/2005 | Sakashita et al. | |
| 2005/0130671 A1 | 6/2005 | Frank et al. | |
| 2005/0162523 A1 | 7/2005 | Darrell et al. | |
| 2005/0165548 A1 | 7/2005 | Persson | |
| 2005/0288858 A1 | 12/2005 | Amer et al. | |
| 2006/0041375 A1 | 2/2006 | Witmer et al. | |
| 2006/0103590 A1 | 5/2006 | Divon | |
| 2006/0208927 A1 | 9/2006 | Poor et al. | |
| 2006/0270460 A1 | 11/2006 | Konkka et al. | |
| 2006/0294062 A1 | 12/2006 | Folchetti et al. | |
| 2007/0035562 A1 | 2/2007 | Azuma et al. | |
| 2007/0049313 A1 | 3/2007 | Grams et al. | |
| 2007/0050129 A1 | 3/2007 | Salmre | |
| 2007/0055441 A1 | 3/2007 | Retterath et al. | |
| 2007/0150179 A1 | 6/2007 | Pinkus et al. | |
| 2007/0162942 A1 | 7/2007 | Hamynen et al. | |
| 2007/0288196 A1 | 12/2007 | Frank et al. | |
| 2008/0049016 A1 | 2/2008 | Shearer | |
| 2008/0069404 A1 | 3/2008 | Lee et al. | |
| 2008/0070684 A1* | 3/2008 | Haigh-Hutchinson | 463/32 |
| 2008/0109758 A1 | 5/2008 | Stambaugh | |
| 2008/0114564 A1 | 5/2008 | Ihara | |
| 2008/0133488 A1 | 6/2008 | Bandaru et al. | |
| 2008/0154494 A1 | 6/2008 | Kato et al. | |
| 2008/0162032 A1 | 7/2008 | Wuersch et al. | |
| 2008/0262723 A1 | 10/2008 | Wuersch et al. | |
| 2009/0083627 A1 | 3/2009 | Onda et al. | |
| 2009/0110235 A1 | 4/2009 | Marti | |
| 2009/0222482 A1 | 9/2009 | Klassen et al. | |
| 2009/0227269 A1 | 9/2009 | Frank et al. | |
| 2009/0278949 A1 | 11/2009 | McMahan et al. | |
| 2010/0097316 A1* | 4/2010 | Shaw et al. | 345/158 |
| 2010/0123605 A1* | 5/2010 | Wilson | 341/20 |
| 2010/0295971 A1* | 11/2010 | Zhu | 348/240.99 |
| 2010/0303293 A1 | 12/2010 | Caduff | |
| 2010/0306200 A1 | 12/2010 | Frank et al. | |
| 2010/0306707 A1 | 12/2010 | Caduff | |
| 2011/0124351 A1 | 5/2011 | Frank et al. | |

FOREIGN PATENT DOCUMENTS

| | | |
|---|---|---|
| JP | 2008-252930 A | 10/2008 |
| JP | 2008-257604 A | 10/2008 |
| WO | WO-2008/005795 | 1/2008 |
| WO | WO-2009/111578 | 9/2009 |
| WO | WO-2010/075455 | 7/2010 |
| WO | WO-2010/075456 | 7/2010 |
| WO | WO-2010/075466 | 7/2010 |
| WO | WO-2010/078455 | 7/2010 |

OTHER PUBLICATIONS

Tsukada et al., "Uni-finger: gesture input device for mobile use", Proceedings of APCHI 2002, vol. 1, pp. 388-400, 2002.*

Baudel et al., "Charade: remote control of objects using free-hand gestures", Comm. ACM, vol. 36, No. 7, pp. 28-35, 1993.*

Wilson et al., "Xwand: UI for intelligent spaces", Proceedings of the SIGCHI conference on Human factors in computing systems, pp. 545-552, 2003.*

Egenhofer, M. J. et al., "A Mathematical Framework for the Definition of Topological Relationships", *Proceedings of the 4th International Symposium on Spatial Data Handling,* Zurich, Switzerland, Jul. 23-27, 1990, pp. 803-813.

Egenhofer, M.J. et al., "Beyond Desktop GIS A Family of Portable Spatial Information Technologies", In *GIS PlaNET,* Lisbon, Portugal, 1998, 4 pages.

Egenhofer, M.J. et al., "Categorizing binary topological relations between regions, lines, and points in geographic databases", Tech. Rep. 90-12, National Center for Geographic Information and Analysis, University of California, Santa Barbara, CA, 1990, 28 pages.

International Search Report and Written Opinion of the International Searching Authority, the European Patent Office, for International Application No. PCT/US2007/072358, dated Nov. 30, 2007, 8 pages.

International Search Report and Written Opinion, International Patent Application No. PCT/US09/36053, mailed Apr. 22, 2009, 6 pages.

Wuershch, et al., "Refined Route Instructions Using Topological Stages of Closeness," presented at the Geological Information Science Conference in Munster, Germany on Sep. 20-23, 2006 (www.giscience.org), pp. 31-41, 12 pages.

International Search Report for PCT/US09/69237 from the International Searching Authority of the United States Patent & Trademark Office, dated Mar. 4, 2010, 2 pages.

International Search Report for PCT/US09/69312 of the International Searching Authority of the United States Patent and Trademark Office, dated Mar. 4, 2010, 2 pages.

International Search Report for PCT/US09/69860 of the International Searching Authority of the United States Patent and Trademark Office, dated Mar. 2, 2010, 2 pages.

International Search Report for PCT/US09/69313 of the International Searching Authority of the United States Patent and Trademark Office, dated Feb. 19, 2010, 2 pages.

Supplemental European Search Report issued for EP09837177, dated Mar. 8, 2013 (2 pages).

Hata, et al. "Querying Multiple Perspective Video by Camera Metaphor." Journal of Federation of Information Processing, vol. 42, No. SIG4(TOD9). Mar. 2001. (pp. 14-26, 14 pgs. total).

Fujita, et al. "Complementary Data Development of Photographs and Annotations Based on Spatial Relationships." Journal of Federation Information Processing, vol. 47, No. 1. Jan. 2006. (pp. 63-76, total 16 pgs.).

* cited by examiner

SYSTEM AND METHOD FOR INITIATING ACTIONS AND PROVIDING FEEDBACK BY POINTING AT OBJECT OF INTEREST

CROSS-REFERENCE TO RELATED APPLICATION

This application claims priority under 35 U.S.C. §119(e) to U.S. Provisional Application No. 61/139,843, filed Dec. 22, 2008 entitled "System and Method for Providing Feedback by Pointing at Object of Interest," the entire contents of which are incorporated herein by reference.

FIELD OF INVENTION

The present invention relates generally to systems and methods for providing feedback relating to spatial objects, elements, or functional artifacts related to spatial objects, and controlling actions or services that are performed in a functional dependency of the spatial object. More specifically, the present invention relates to distributed systems and methods that initiate or manipulate activities and services, bookmark, or attach comments, hyperlinks, ratings, or multimedia to representations of the spatial objects in database systems, by pointing at the spatial object or feature of interest in the real-world.

BACKGROUND OF THE INVENTION

Geotagging and Geoblogging are increasingly popular techniques for attaching location information to various types of media. Geotagging, sometimes also referred to as Geocoding, is the process of adding geographical identification metadata to media such as websites, RSS ("Rich Site Summary") feeds, or images, typically, in the form of geospatial metadata. However, there are some differences between Geotagging and Geocoding. Generally, Geotagging information associated with a location consists of latitude and longitude coordinates, which also may include altitude, bearing, and place name information. Geocoding, on the other hand, refers to the process of taking non-coordinate based geographical identifiers, such as a postal address, and assigning geographic coordinates to them (or vice versa).

Geotagging media assists system users to find a wide variety of location-specific information. For example, a system user can find images taken near a given location by entering latitude and longitude coordinates into a Geotagging-enabled image search engine. Geotagging-enabled information services also can potentially be used to find location-based news, websites, or other resources.

Geoblogging, in contrast to geotagging, attaches specific geographic location information to blog entries. The geographic location information is typically identified by geotags, which usually consist of latitude and longitude information. Searching a list of blogs and pictures tagged using geotag technology allows system users to select areas of specific interest to them on interactive maps.

Similar to geotagging and geoblogging, the use of "pointing at" technology allows system users to point out spatial objects and features in order to retrieve information related to them stored in a database. This technology is becoming increasingly popular predominantly in domains, such as location-based services ("LBS") or gaming.

The current generation of handheld devices, such as cellular phones and personal digital assistants ("PDAs"), include all of the components and sensors required to derive the system user's position and direction of pointing, as well as the modules for wireless communication with information storing databases. These components, together with a three-dimensional representation of the environment in a database, enables the identification of spatial objects or features simply by pointing at them.

Generally, conventional pointing technology methods retrieve information about the object being pointed at; however, there is no two-way communication between the system user and spatial objects. Establishing a bi-directional communication channel between a system user and spatial objects will allow interaction between the system user and the environment, and lead to more efficient and effective use of information and services associated with spatial objects or features in the environment around the system user of a handheld or other device.

SUMMARY OF INVENTION

The system and method of the present invention is directed to compiling feedback and/or command statements that relate to applications or services associated with spatial objects or features, pointing at spatial objects or features in order to identify the object of interest, and executing a command statement on a system server or attaching the feedback to the representation of the object or feature in a system database on a system server.

Feedback, according to the present invention, includes all forms of system user input, including, but not limited to, hyperlinks, comments and anecdotes, ratings, tags, keywords, images and sketches, audio or voicenotes, and videos that relate to the spatial object or feature of interest. Command statements, according to the present invention, include all types of actions, as long as such actions relate to appliances, applications, or services on the system server used to relate information to and with the spatial object or feature of interest. Command statements include, but are not limited to, bookmarking objects of interest, launching applications or services related to the object or feature, or configuration statements that relate to the state of any application or appliance associated with the object or feature. Applications as used herein, include but are not limited to, information systems, database management systems, web applications, dedicated and embedded applications, and any other tool that functions and is operated by a computer. Appliances as used herein, include but are not limited to, automated teller machines, meters, automated systems for doors, lights and displays, household devices, and other electrical and mechanical instrument or apparatus designed or used as a means to a specific end. And services as used herein, include but are not limited to, web services, bookmarking and registration services, electronic counter services, automated teller services, vending and ticketing services, and any other software system designed to support interoperable machine-to-machine interaction over a network.

According to the present invention, an object of interest is identified by a system user by pointing at it. By doing this, the system user's position and direction of pointing are used to create a ray in three-dimensional space, which is then intersected with a two-dimensional projection of the system user's current scene. In this scene, the object being pointed at is subsequently identified and used as a dispatcher to associate functional units on the system server. The two-dimensional projection of the current scene is generated from a representation of the environment stored in a database on the system server. This representation of objects or features that define the environment on the system server is linked to information, applications, services, appliances, and other functional units that relate to individual objects or features.

The system client according to the present invention consists of a user interface that allows the system user to select command statements or compile feedback in any form, such as hyperlinks, ratings or comments, or multimedia. Feedback may be provided for any object, feature, service, or function as long as it is associated with corresponding objects or features existing in geographic space. Examples of feedback include comments about museums, photos of monuments, videos of buildings, bridges, roads, etc., but also audio tags for food or service in a restaurant, notes of problems associated with some traffic element (hidden highway speed sign), or even personal comments about experiences or happenings associated with other spatial objects or features. Feedback also may be tailored to suit specific sites or exhibitions that are displayed only for a short period of time, but wish to collect feedback about performance or preference of displayed items or artists.

Command statements may be presented for selection to a system user in various forms, such as, for example, buttons on a user interface or menu items. Command statements may be addressed directly to appliances, applications, or services linked with spatial objects or features in the real-world through corresponding associations with the representations of these spatial objects or features on the system server or in the system database. Examples of command statements of this type are (i) switching on and off the light of a building by simply pointing at the building in the real-world, (ii) registering the real-world object with a social bookmarking service by pointing at the object in the real-world, or (iii) starting, stopping, or pausing a virtual service running on a system server, but associated with the representation of the spatial object or feature by pointing at the spatial object or feature in the real-world.

A system client, typically a mobile device, is adapted for wireless communication with a virtual system or database that contains spatial objects and features representing the system user's environment and links to associated functional units. In order to identify the spatial object or feature of interest on the system server, the system client includes modules for acquiring position information, e.g., GPS for outdoor positioning or WLAN ("wireless local area network") triangulation for indoor positioning, as well as directional information, i.e., electronic compass, pitch, and yaw.

In operation, the system user points at the spatial object or feature of interest in order to collect current position and direction information. This information is then, together with the command statement or system user-generated feedback and contextual information, sent to the system server. At the system server, it is separated into appropriate segments. These segments are used to (i) identify the spatial object or feature of interest, (ii) identify the type of command or feedback, and (iii) dispatch the command to the associated execution unit or attach the feedback to the representation of the spatial object or feature of interest stored in the system database.

The following are representative examples of the present invention:

As a first example, if Person A is having dinner in Restaurant C and the dinner is delicious, Person A may want to share the experience with others. Currently, Person A's options are limited to (i) informing the restaurant owners about the great dining experience by orally telling them, or sending letter or e-mail, (ii) accessing the Internet at home or somewhere else and posting a comment about the great dining experience at Restaurant C, for example, by looking up the Restaurant C's webpage and posting a comment in the guestbook, or (iii) posting a blog about the experience.

The present invention enables system users, such as Person A, to stand in front of the restaurant, like Restaurant C, type comments or a note on their handheld device about the great dining experience, and point at Restaurant C in order to submit the comments or note to the system server. At the system server, the message containing the comments or note is separated into pointing information from which the object is identified, and the system user's comments or note are then attached to the spatial object or feature of interest. The information about the spatial object or feature of interest is subsequently available for everybody consulting the web or pointing at this object or feature in the field in order to retrieve information about the object or feature.

A second example relates to real estate and home shopping. Person K is exploring a neighborhood in search of a new home. While exploring the neighborhood, Person K keeps notes on homes that are for sale. Some of the homes are more interesting than others and in order to keep notes and prepare for meetings with various real estate agents, Person K tediously writes down the corresponding addresses, along with the phone numbers of agents. Using the present invention, Person K would simply point at the building of interest and register it with a bookmarking service, without having to write down anything at all. Back at home, Person K could use the bookmarking service to generate a list of addresses for the bookmarked homes or a list of phone number of agents that are in charge of the bookmarked homes.

The present invention combines pointing, geotagging, and geoblogging in order to define a novel system and method, which enables system users to add information or media to a spatial object or feature in the database, rather than just attaching geographic location information to media. As such, the present invention differs from geotagging and geoblogging in a number of ways, these include, but are not limited to, not attaching location information to specific media, but attaching the media to the representation of the spatial object or feature in the database simply by pointing at the spatial object or feature in the real-world. Moreover, the present invention extends geotagging and geoblogging by allowing system users to address objects or features within the system user's field of view by pointing at the reference object or feature, and attaching information about this object or feature to its representation stored in a system database.

The present invention further extends social bookmarking services by a method that allows bookmarking objects or features within the system user's field of view simply by pointing at the object or feature. The present invention extends spatial interaction with real-world objects or features by a pointing mechanism enabling interaction between system users and representations of real-world objects or features.

The present invention enables system users to execute commands associated with the representations of spatial objects or features on a system server by pointing at their counterpart in the real-world. The present invention extends remote control of services or appliances by allowing the control and management of appliances, applications, or services by pointing at the object or feature in the real-world.

The present invention will be described in greater detail in the remainder of the specification referring to the drawings.

DETAILED DESCRIPTION OF THE INVENTION

The system and method of the present invention are for compiling feedback or command statements that relate to applications or services associated with spatial objects or features, pointing at spatial objects or features in order to identify an object or feature of interest, and executing the command statement on a system server or attaching the feedback to a representation of this object or feature in a system database on a system server.

Figure 1:
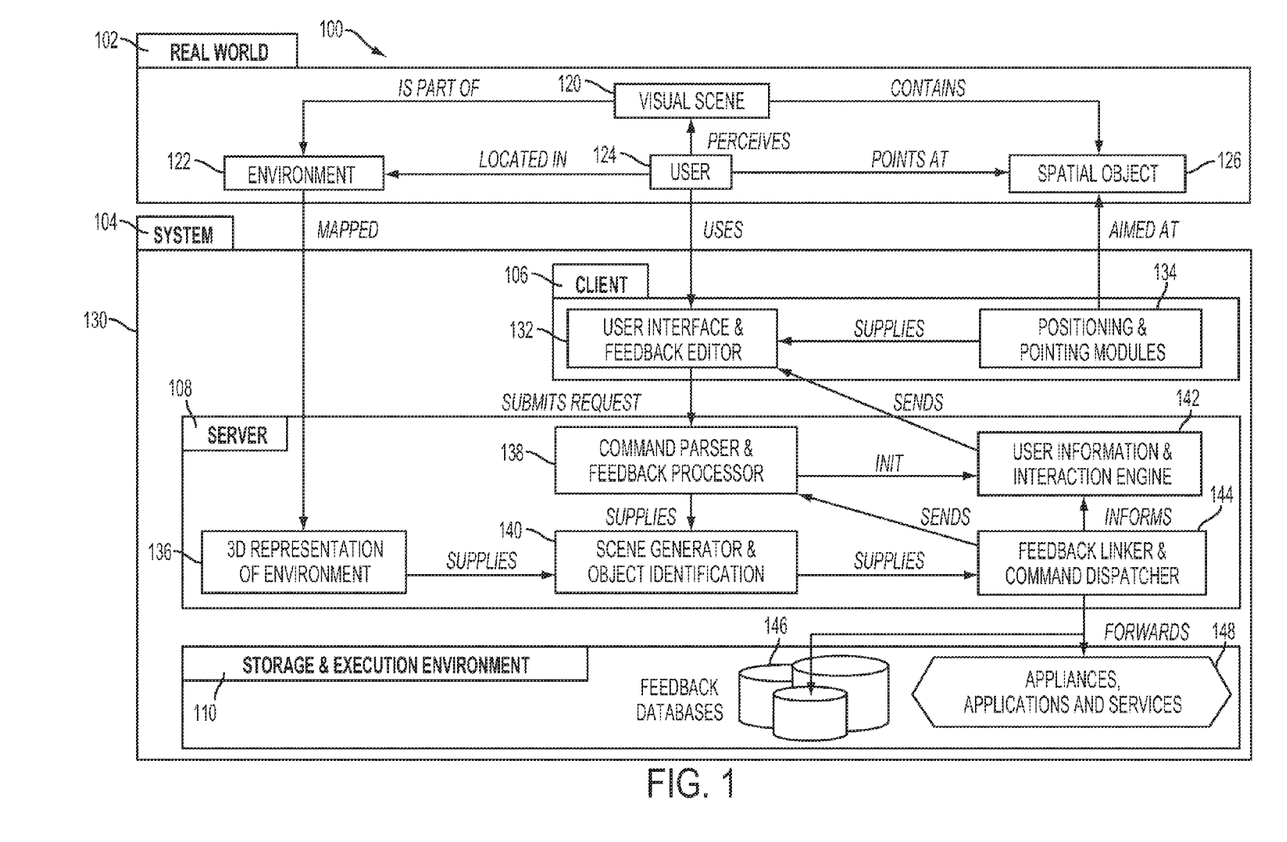
FIG. 1 shows a block diagram of a representative system for carrying out the present invention.

FIG. 1, generally at 100, shows a general overview of the system of the present invention. FIG. 1 also shows the general information data flow among the elements of the system of the present invention. Further, FIG. 1 shows the basic workflow according to a method of the present invention, which will be described in greater detail subsequently.

Referring to FIG. 1, system 100 of the present invention is shown in relation to the real-world 102. The real-world 102 represents a visual scene that would be viewed by the system user. System 104 includes system client 106, system server 108, and storage and execution environment 110. As shown at 102, System User 124 will be located in environment 122 and will see visual scene 120 which is part of environment 122. Visual scene 120 includes one or more spatial objects 126 that may be pointed at by System User 124.

As stated, system 104 includes system client 106, system server 108, and storage and execution environment 110. System User 124 interacts directly with system client 106 that includes User Interface and Feedback Editor 132, and Positioning and Pointing Modules 134. System User 124 principally interacts with system client 106 at User Interface and Feedback Editor 132. When System User 124 points system client 106 at spatial object 126, Positioning and Pointing Modules 132 can determine the position of the specific spatial object or feature being pointed at and supplies this information to User Interface and Feedback Editor 132 for display to System User 124 that will relate to the identification of the pointed at object or feature.

System server 108 receives mapped information relating to environment 122 in which System User 124 is located. More specifically, system server 108 at 136 receives three-dimensional (3-D) representation information about environment 122 based on the location and pointing direction of system client 106. The geographic location may be provided to system server 108, by, for example, a GPS sensor associated with system client 106. Other methods of determining environment scene may be used and still be within the scope of the present invention.

The three-dimensional representation of environment 122 at 136 is provided to Scene Generator and Object Identification 140. User Interface and Feedback Editor 132 sends system user requests for identification of spatial objects or features of interest being pointed at by System User 124 to Command Parser and Feedback Processor 138. Command Parser and Feedback Processor 138 determines if the request is a command statement only or whether there is a feedback statement as part of the request. Command Parser and Feedback Processor 138 transmits command statements to User Information and Interaction Engine 142 and feedback statements to Scene Generator and Object Identification 140.

Scene Generator and Object Identification 140 provides the identity and likelihood of the accurate identification of objects or features of interest to Feedback Linker and Command Dispatcher 144. The purpose of Feedback Linker and Command Dispatcher 144 is to dispatch system user generated feedback or actions to the executing instance for objects or features of interest in Storage and Execution Environment 110, and/or to generate feedback for the separate system user in case of inaccurate object or feature identification. Feedback Linker and Command Dispatcher 144 sends system user-generated feedback to system database 146 for linking with stored information relating to spatial objects or features, and commands to be executed by appliances, applications, and services at 146. Feedback Linker and Command Dispatcher 144 also sends information to Command Parser and Feedback Processor 138 and informs User Information and Interaction Engine 142 of the performance of the object identification process, and the success, failure, or state of dispatching and linking system user generated feedback and commands to the corresponding instance. User Information and Interaction Engine 142 sends information about the outcome of object or feature identification, and/or dispatch and linking operations to User Interface and Feedback Editor 132. Certain of this information will be displayed on the user interface of User Interface and Feedback Editor 132. For example, User Interface and Feedback Editor 132 may display the success or failure of object or feature identification, state of feedback linking, and/or progress of command execution. Other information may be sent from User Information and Interaction Engine 142 to User Interface and Feedback Editor 132 for the display and still be within the scope of the present invention.

As stated, Feedback Linker and Command Dispatcher 144 sends system user-generated commands and, if necessary, the object or feature identity information to appliances, applications, and services 148. By way of example only, appliances, applications, and services, include, but are not limited to, electronic-mechanical devices controlled within the scope of the object or feature of interest (e.g., automated door opener), software applications associated with the object of interest (e.g., electronic meters), and dedicated or generic bookmarking or registering services. Other appliances, applications, and services may apply and still be within the scope of the present invention.

It is understood that the elements of system server 108 may be separate modules or integrated into one or more modules and still be within the scope of the present invention. It is also understood that the elements of client serve 106 may be separate modules or integrated into one or more modules and still be within the scope of the present invention. It is further understood that the elements of Storage and Execution Environment 110 may be separate modules or integrated into one or more modules and still be within the scope of the present invention.

Figure 2:
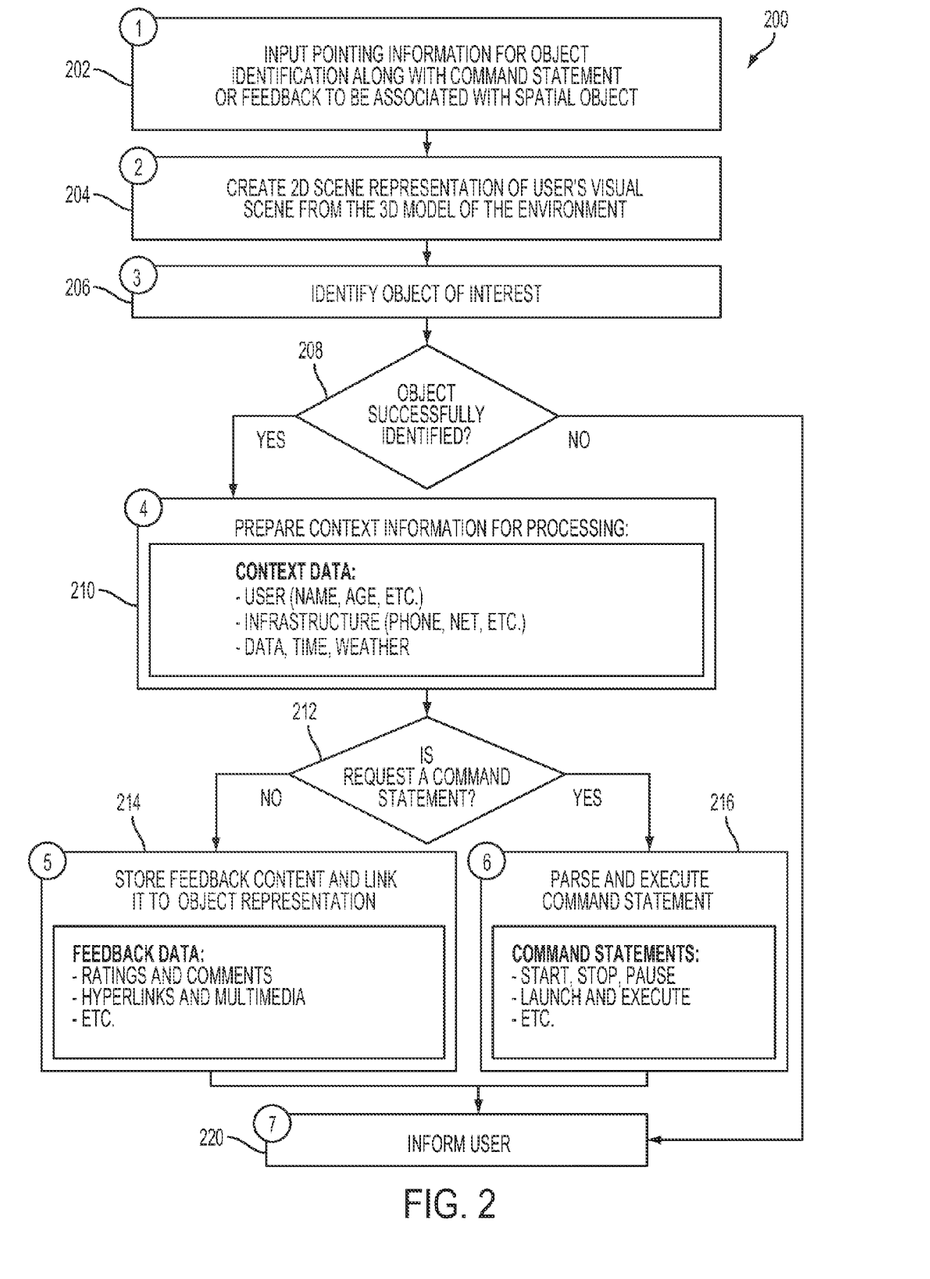
FIG. 2 shows a representative flow diagram for carrying out the method of the present invention.

Referring to FIG. 2, shown generally at 200, the steps of the method of the present invention will be described. In describing the steps of the present invention according to FIG. 2, reference also will be made to FIGS. 1 and 3.

Generally, Step 1 at 202 is for inputting pointing information for object or feature identification along with command statements or feedback associated with a spatial object or feature of interest. This is performed by the system user selecting a command statement or generating feedback by entering specific information using user interface ("UI") of system client 106, such as in User Interface and Feedback Editor 132 (FIG. 1). The UI is adapted such that the system user can insert multiple or just specific types of commands or feedback. Examples of command statements are (i) "start," "stop," "pause applications or services," (ii) "bookmark items," or (iii) configuration statements. The purpose of command statements with regard to appliances, applications, or services is to control, manipulate, and/or inform these entities. The command statements that are provided are by way of example and not of limitation. It is understood that other command statements may be used and still be within the scope of the present invention. Examples of feedback include, but are not limited to, hyperlinks or URLs, ratings, comments, tags, keywords, or all types of media items, or a combination thereof, depending on the scope and purpose of the situation.

Preferably, command statements may be selected by the system user from drop down lists or menu items placed on the UI, or typed by the system user on a console interface on system client 106. Feedback generation, however, is preferably carried out using an application-specific system user interface. An example of an application-specific system user interface for feedback generation is shown in FIG. 3 generally at 300.

Figure 3:
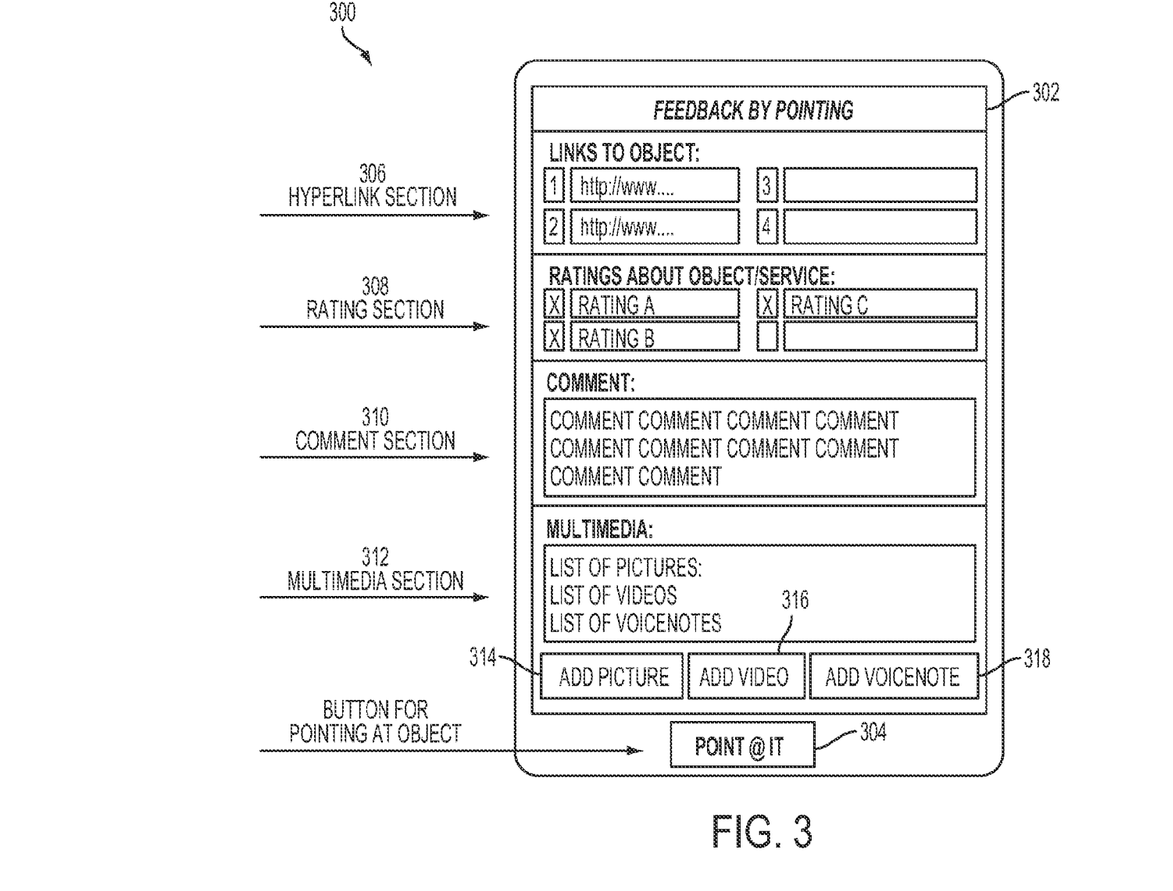
FIG. 3 shows a representative user interface for a system client for providing feedback about a specific spatial object or feature of interest.

Referring to FIG. 3, a preferable application-specific system user interface is shown at 300 for providing feedback about specific spatial objects or features. Application-specific system user interface 300 will enable the system user to add different types of feedback. In FIG. 3, the interface titled "Feedback by Pointing" is shown at 302. This interface is shown with four sections. The first is hyperlink section 306; the second is rating section 308; the third is comment section 310; and the fourth is multimedia section 312. It is understood that there may be more or less than four sections associated with the interface and still be within the scope of the present invention.

At the bottom of the system user interface 300 is button 304 for uploading to system server 108, system user generated feedback relating to the spatial object or feature being pointed at. The activation of this button will be described in greater detail subsequently.

Referring to hyperlinked section 306, the system user can enter hyperlinks with regard to the spatial object or feature being pointed at. For example, if the system user is reading the menu posted outside of a restaurant where the system user has enjoyed a meal, system user could enter the hyperlink of the restaurant on the menu in hyperlinked section 306. In FIG. 3, there are four spaces provided for entering hyperlinks. It is understood that there may be a more or less and than four spaces provided for entering hyperlinks and still be within the scope of the present invention.

At rating section 308, the system user can enter ratings about an object or service based on his/her experience. It is noted that rating section 308 provides spaces for rating an object or service with a "Rating A," "Rating B," or "Rating C." It is understood that more than these three ratings may be used and still be within the scope of the present invention.

Comment section 310 is used by the system user to input any comments he/she has relating to the spatial object or feature. The comments may be confined to the area provided or unlimited with a scrolling screen to capture the full extent of the system user's comments.

Multimedia section 312 is used by the system user to input multimedia associated with the object of interest. This may include lists of pictures, videos, voice notes, or other multimedia sources of information that may be available that relate to the object or feature. In order for the system user to add pictures, he/she will activate button 314 for picture download. Similarly, the system user would activate button 316 for adding videos and button 318 for adding voice notes. If there are other types of multimedia source information to be added via the interface, there would be a button made available on interface for that purpose. Although only three buttons for adding multimedia information are shown for adding multimedia information, namely buttons 314, 316, and 318, it is understood that more or less than three buttons for adding multimedia information may be available on interface and still be within the scope of the present invention.

After system user has entered the feedback information about the spatial object using interface 300, and wants to link it to a representation of the spatial object or feature in the system server database, he/she points at the object or feature of interest and activates point@it button 304. This will upload the feedback information to system server 108. It is also understood that the system user can point the device having application-specific system user interface 300 at the object of interest before compiling the feedback data and it will still be in the scope of the present invention.

Referring to FIG. 1, when point@it button 304 is activated, system client 106 connects to Positioning and Pointing Module 134 and extracts system client 106's (i) position in latitude, longitude, altitude, or according to x, y, and z positioning in an x, y, and z coordinate system, and (ii) direction in yaw and pitch. These measurements together with the system user feedback or command statement are then submitted as a "request" to the system server for further processing. The request that includes the system user generated feedback or command statement and is sent from system client 106 to system server 108. Preferably, the request will include at least the following components that are in BNF ("Backus Naur Form") notation:

```
<Request> ::=
    <Context>
    (<Feedback> | <Command_Statement>)
    (<HERE_Location> | <THERE_Location>)
<Context> ::=
    <Personal>
    <Infrastructure>
    <Environmental>
    <Temporal>
```

-continued

| | |
|---|---|
| <Personal> ::= | 'User ID, Name, Age, Gender, Interests, etc.' |
| <Infrastructure> :: = | 'Type of network, bandwidth, etc.' |
| <Environmental> :: = | 'Weather, Noise, other sensory input' |
| <Temporal> ::= | 'Date, Time, User's path to this location, etc.' |
| <Feedback> ::= | |
|     <URI> | [<URI>] | |
|     <Comment> | [<Comment>] | |
|     <Tag> | [<Tag>] | |
|     <Keyword> | [<Keyword>] | |
|     <Rating> | [<Rating>] | |
|     <Multimedia> | [<Multimedia>] |
| <URI> ::= | 'any URI' |
| <Comment> ::= | 'any Comment or application-specific scheme-based Comment' |
| <Rating> ::= | 'any Rating or application-specific scheme-based Rating' |
| <Tag> ::= | 'any Tag that is associated with the object' |
| <Keyword> ::= | 'any Keyword that is associated with the object' |
| <Multimedia> ::= | 'any list of multimedia items or files' |
| <Command_Statement> ::= | |
|     <Command > | [<Option> [<Option>]] |
|     [<Command > | [<Option> [<Option>]]] |
|     <Target> | [<Target>] |
| <Command> ::= | 'any command associated with object, e.g., start, stop, pause, configure' |
| <Option> ::= | 'any option associated with command, e.g., time stamp' |
| <Target> ::= | 'target appliance, application, or service, e.g., bookmarking service' |
| <HERE Location> ::= | 'user's current position identifying feature of interest' |
| <THERE Location> ::= | 'pointing data for identification of object of interest' |

Referring to the feedback statement shown above, there are three principal components of the statement. These components are the (i) Context, (ii) Feedback or Command Statement, and (iii) HERE or THERE Location.

The Context component sets forth a set of properties that describe the identity and interests of the system user, as well as the personal, infrastructure, environmental, and temporal characteristics under which the feedback statement was compiled and submitted to system server 108.

The Feedback component of the feedback statement consists of any URL, comment, rating, document, multimedia, or other piece of information that the system user wants to attach to the object of interest. Preferably, the Command Statement component is a three-valued statement that includes information about what target appliance, application, or service that needs to be manipulated when pointing at an object or feature, and related options. In referring to related options, it is understood to mean optional commands for refining parameters or attributes, such as additional command attributes (e.g., user name), control parameters (e.g., safe execution only), or time-dependent execution (e.g., now or a specific date/time).

The HERE or THERE Location component includes information that is required for identifying an object or feature of interest. A HERE Location refers to a spatial object or feature located at the system user's current location. A THERE Location refers to a spatial object or feature that is located at a distant position. This is shown graphically in FIG. 4.

Figure 4:
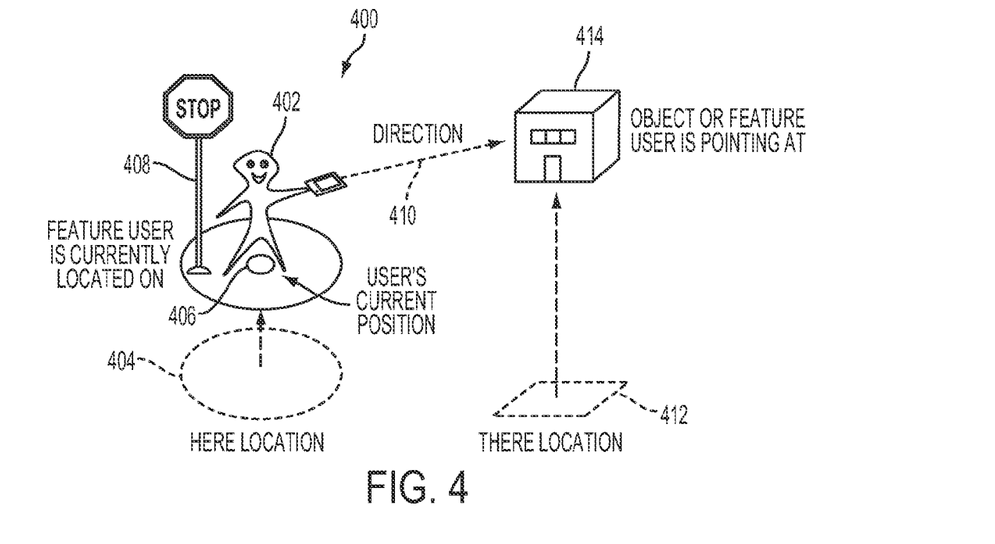
FIG. 4 shows a representative diagram relating to HERE and THERE locations.

Referring to FIG. 4, generally at 400, HERE and THERE Locations will be described in detail. System User 402 is standing at system user position 406. This position would have a latitude, longitude, and altitude. A predetermined distance around a system user's position defines HERE Location 404. If a spatial object, such as stop sign 408, is located at the HERE Location 404, it could be identified by the system server as an object at the HERE Location. It is understood that the definition of the size of the HERE Location may be larger or smaller and cover a shape that is different from what is shown in FIG. 4 and still be within the scope of the present invention.

Again referring to FIG. 4, if system user 402 desires to identify a distant object or feature of interest, such as building 414, system user 402 at HERE Location 404 would point system client 106 in direction 410 toward building 414. Distant building 414 would be located at THERE Location 412.

Again referring to FIG. 2, Step 2 at 204 provides for the generation of a two-dimensional (2-D) representation of the system user's visual scene from the three-dimensional (3-D) model of the environment surrounding the system user. In contrast to HERE Location 404 in FIG. 4, THERE Location 412 uses a different method for identification. The method by which distant objects of interest are identified is to generate a 2-D digital scene from the representation of the environment stored in the system database 146 of storage and execution environment 110 (FIG. 1). This digital scene will represent the system user's current field of view. Within the scene, the system and method of the present invention will intersect a ray defined by the system user's current position and pointing direction with the spatial object or feature within the scene. This will result in the identification of objects or features of interest.

Referring to FIG. 2, Step 3 at 206 of the present invention will be described. At Step 3, the object or feature of interest is identified. If, for example, there is a single object spatially dispersed from other objects to which system client 106 is being pointed, then the 2-D scene that is generated only shows that object or feature, and it can be correctly identified from information stored in the system database. However, to the extent that the identification of any spatial object or feature of interest cannot be carried out with a sufficient level of accuracy and confidence, the system user is informed by the system of this, and asked to resubmit the request or choose the select object from a list of possible objects. This method identification will be described in more detail referring to FIG. 5.

Figure 5:
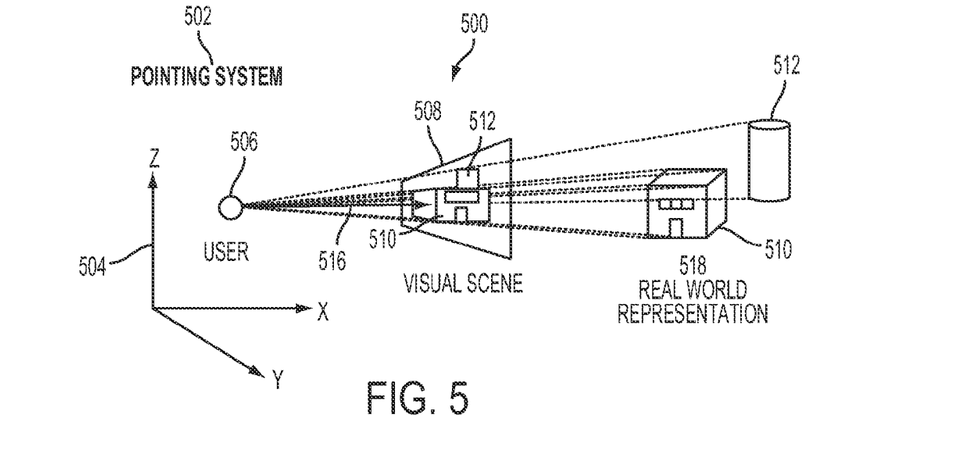
FIG. 5 shows a representative example of a visual scene which system users may use to provide feedback by pointing.

Referring to FIG. 5, generally at 500, the description for identifying an object or feature of interest where there may be more than one object in the pointing direction of system client 106 will be provided. Pointing system 502 is based on x, y, z coordinate system 504. Based on coordinate system 504, system user 506 will have a latitude, longitude, and altitude. By pointing system client 106 in a specific direction, yaw and pitch associated with system user's position will be generated. As shown in FIG. 5, by the system user pointing in direction 516, there is generation of 2-D visual scene 508. In that visual scene, are building 510 and silo 512. As shown in real-world representation 518, building 510 and silo 512 are different objects that are spaced apart but in 2-D visual scene 508 they are overlapping. Without any additional information, it could not be determined with any confidence whether system user 506 is pointing at building 510 or silo 512.

According to the method of the present invention, object or feature identification is carried out using statistical methods and error propagation principles in order to assess the reliability of pointing. Examples of the statistical methods and error propagation principles are the following t-test for correspondence of pointing direction and likely target objects or features, and—geodetic methods for assessing propagation of GPS and compass errors in a visual scene. There also may be default reliability criteria set for the system which if not met will notify the system user of same and require additional information before identification can be made and confirmed.

Referring to FIG. 2, at decision point 208, the system and method of the present invention determines whether or not identification of the object of interest has been made with sufficient accuracy according to system settings. If the answer is "No," then the system and method will move to Step 7 at 220 and inform the system user that identification could not be made without additional information. If the answer is "Yes," then the system and method will proceed to Step 4 at 210.

Referring to Step 4 at 210 in FIG. 2, preparation of context information will be described. As discussed above with respect to feedback data that is provided by the system user using system client 106, there are three main components of the feedback statement submitted to the system server; one of them is Context (contextual) information.

When contextual information is input by the system user into system client 106, it is processed to be added as part of the command statement or feedback statement submitted to system server 108. The accurate capture of the Context information is important to ensure the quality of the data attached to a spatial object or feature. For example, if system user A and system user B are rating the "fear factor" they both experienced in crossing a park, the context of their crossing will have impact on their rating of the park. If system user A crosses the park during daylight and rates the park as open and friendly, that rating will reflect the time of day of the crossing. However, if system user B across the park at night and rates the park as dark and scary due to many missing lights, this context is very different than the one experienced by system user A. Therefore, if the contextual information of each crossing is attached to the rating, the differences in these ratings could clearly be understood and explained. As such, the contextual information stored with each feedback item provides insights about the circumstances under which the system user feedback was generated.

Referring again to FIG. 2, Step 4 at 210 provides examples of personal contextual data that may be included. This information may include system user data such as the system user's name, age, gender, or other personal information. Infrastructure contextual data may be the type of system client device being used, such as a phone, PDA, or other device. The environmental contextual data may include weather conditions or other environmental conditions or factors. Temporal contractual data may include the time of day. The above examples are not meant to be of limitation and it is understood that other information may be provided and still be within the scope of the present invention.

At decision point 212, the present invention determines whether or not what is submitted to system server 108 is a command statement or a feedback statement. This will be carried out by the system server at Command Parser and Feedback Processor 138. If it is determined at decision point 212 that what is received by system server 108 from system client 106 is a feedback statement, then the present invention will proceed to Step 5 at 214. However, if what is received by system server 108 from system client 106 is a command statement, the present invention will proceed to Step 6 at 216.

Before discussing Step 5 at 214 in greater detail, generally, Step 5 is directed to linking the individual feedback information generated by the system user to the spatial object or feature of interest identified at Step 3 at 206. These spatial objects or features may be any element that is perceived, visually or otherwise, by the system user and mapped into the system database. These spatial objects or features will also be identified by means of a HERE Location, the system user's current location, or a THERE Location, objects or feature at which the system user is pointing. Spatial objects or features of this type include, but are not limited to, rural objects, urban objects, and even indoor objects. By way of example, urban objects include, but are not limited to, water objects like lakes or ponds; generic city objects like buildings or bridges; city features like crosswalks or traffic lights; or city object groups like districts.

Figure 6:
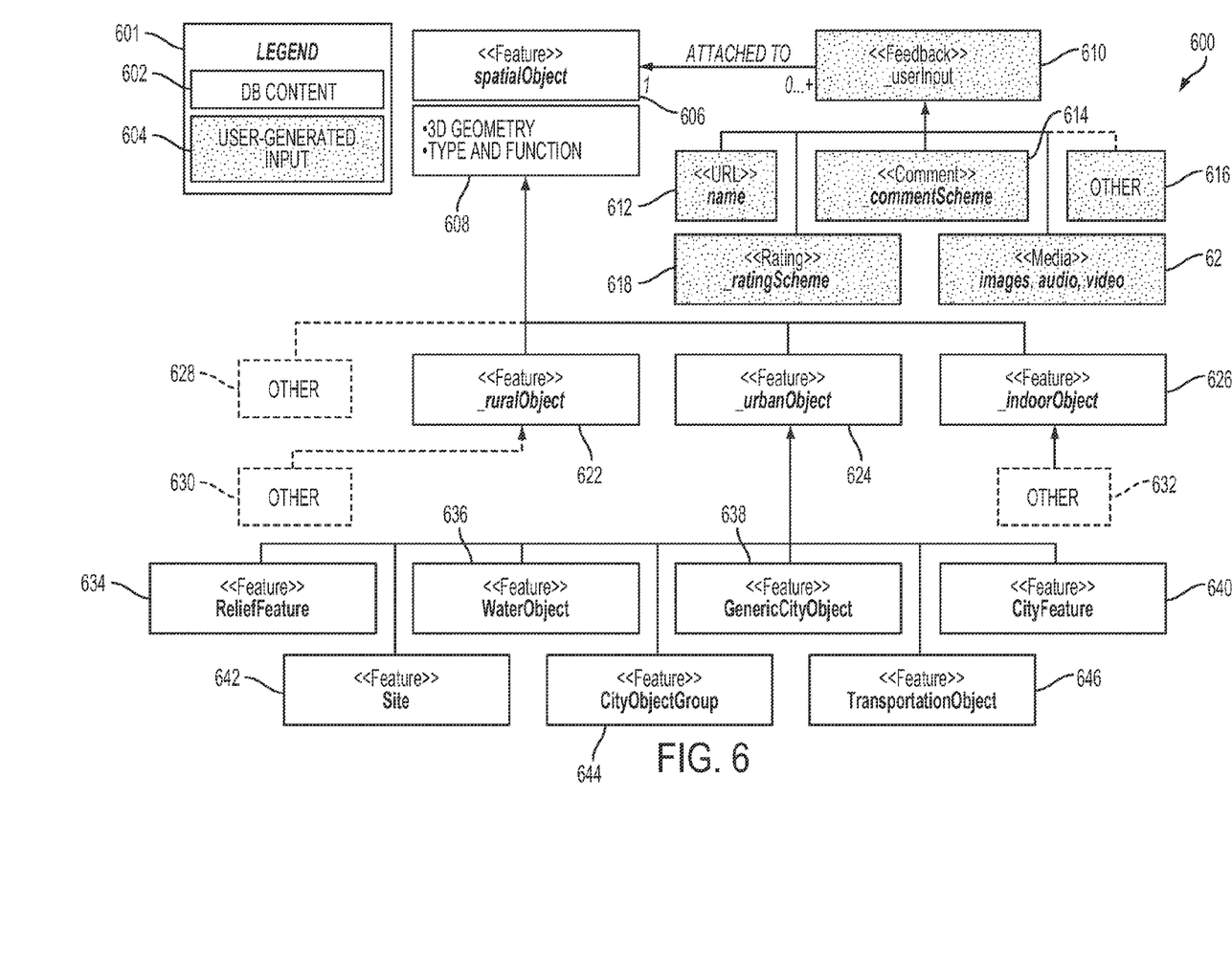
FIG. 6 shows a representative example of levels associated with spatial objects and features to which system user-generated feedback may be attached.

An ontology of geographic space that may serve as a base for the feedback system is represented in the class diagram shown in FIG. 6, generally at 600. This ontology of geographic information is meant to serve only as an example, and is understood to be an incomplete ontology. It is further understood that information may be added to this ontology to make it complete and it would be within the scope of the present invention.

Referring to FIG. 6 at 602, the component information associated with any spatial object or feature is shown in what is referred to as "Legend" 601. These components are the contents of the system database at 604 and the system user-generated feedback at 606. These two components will be used to find and define a spatial object or feature. In order to obtain the information set forth in Legend 601, it is necessary to link the information that is accumulated at 606, which is shown as $$\frac{<<Feature>>}{spatialObject}.$$

Class instances include different class levels to which feedback information attaches. For example, one class level would be the feature class, that includes ReliefFeature 634, Site 642, WaterObject 636, CityObjectGroup 644, GenericCityObject 638, TransportationObject 646, and CityFeature 640. This feature class would inherit all the properties of spatialObject 606. For purpose of example, referring to FIG. 6, an urban object will be described which is intended to be a feature of interest.

At a first class level, an object may be rural object 622, urban object 624, indoor object 626, or other object 628. Rural object 622 may be further defined by other subfeatures such as shown in phantom at 630. Similarly, indoor objects 626 may be further defined by the subfeatures shown in phantom at 632.

Urban object 624 is shown with possible subfeatures. At this second or sub-level, the possible defining subfeatures are relief feature 634, site feature 642, water object 636, city object group 644, generic city object 638, transportation object 646, or city feature 640. Urban object 624 would include at least one of these features. For purpose of example, the feature of interest is a particular art museum, and the feature could be a general city object such as 638. Information about this museum that is stored in a system database will be transmitted to 608 where information relating to the 3-D geometric features and a type and function of the museum would be provided that relate to this feature.

Next, user feedback information is generated at 610 based on system user information at 612, comments provided by system users at 614, rating information about the museum at 618, media information, such as images, audio, or video information, at 620, or other information at 616. This system user feedback is attached to spatial object at 606. The combination of this information at 606 and 608 will generate Legend 601 that includes database content 602 and a system user generated input 604.

According to the foregoing, the feedback statement generated at 610 by the system user based on system user input is attached to the spatial object information based on the level of granularity of the feature classes. The level granularity of spatial objects or features may be based on system settings or determinations by the system user. As an example, system settings may provide that the finest granularity for spatial objects is the level of building blocks, so that when a system user points at some ornament that is part of the building, it will result in attaching the feedback to the building. On the other hand, if the system settings are such that the ornaments of a building define the highest granularity level, then feedback will be attached to an ornament rather than to the building block itself. Therefore, the defined class level will determine where information will attach. This will be explained in greater detail referring to FIGS. 7 and 8.

Figure 7A:
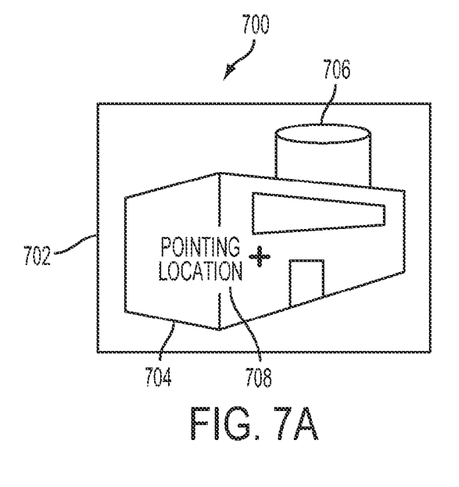
FIGS. 7A and 7B show representative examples of pointing at different elements of a building for attaching system user-generated feedback information.
Figure 7B:
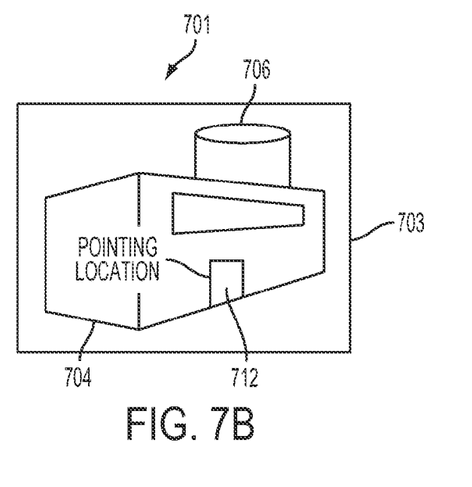

Referring to FIG. 7A, generally at 700, it shows at first representation 702 of a scene where the pointing location is the building. Referring to FIG. 7B, generally at 701, it shows a second representation 703 of the same scene where the pointing location is the front door of the building. Referring to FIGS. 7A and 7B, they each show a 2-D representation of the scene that includes building 704 and silo 706. In FIG. 7A, pointing location 708 is building 704 or the front of the building 704. In this case, the class level of granularity would be building blocks or the level right below building blocks (the front of building 704). As such, the feedback statement information would attach to building 704 or the front of building 704. In FIG. 7B, the pointing location is front door 712. This will mean that the level of granularity would be ornaments of building 704 or features of the front of building 704. Therefore, the feedback statement information would attach to front door 712 as a feature of the building or the front of the building.

Figure 8:
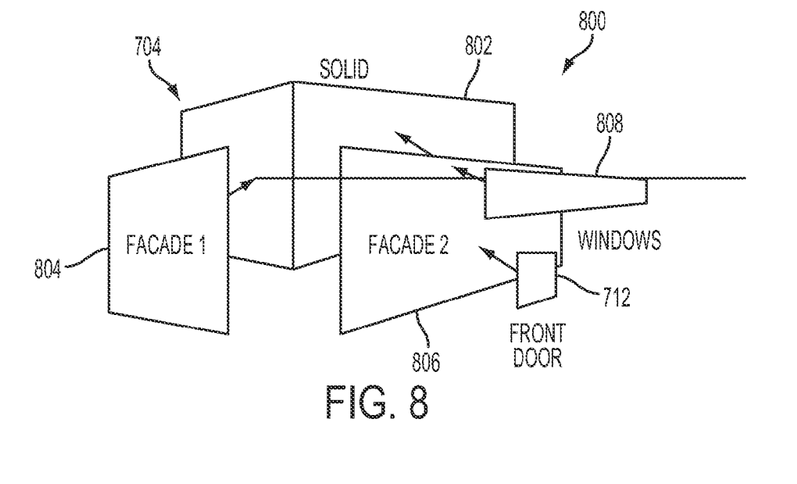
FIG. 8 shows a representative example of elements of a building to which system user-generated feedback may be attached.

Referring to FIG. 8, generally at 800, features of building 704 to which feedback information may attach are shown. For example, feedback information may attach to (i) Class Level 1: the solid form of the building at 802, (ii) Class Level 2: façade 1 at 804 or façade 2 at 806, or (iii) Class Level 3: window 808 on façade 2 or front door 712 on façade 2.

If at decision 212, it is determined that the context information that is provided from Step 4 at 210 is a command statement without a feedback statement, the present invention will proceed to Step 6 at 216. The purpose of Step 6 is to parse and execute command statements.

As set forth above, command statements are processed by system server 104 at 138 and command statement information is transmitted to User Information and Interaction Engine 142 for processing. User Information and Interaction Engine 142 processes the command information and sends instructions to User Interface and Feedback Editor 132 of system client 106 (FIG. 2). The command information that is parsed from the command statements and sent may include, but not be limited to, "start," "stop," "pause applications or services," "bookmark items," or configuration statements. These statements are launched from User Information and Interaction Engine 142 for execution by Appliances, Applications, and Services 146 associated with the object or feature of interest using Feedback Linker and Command Dispatcher 144 as the intermediary between the system user, object of interest, and executing entity.

In more detail, according to Step 6, an incoming command statement is parsed and associated with the spatial object or feature of interest in order to engage an associated appliance, application, or service. This is carried out by a synchronized process involving Command Parser 136, Scene Generator and Object Identification 140, User Information and Interaction Engine 142, and Feedback Linker and Command Dispatcher 144.

In parsing the command statement, it is parsed into the core command, the options that accompanying this command, and the target appliance, application, or service at 148 addressed by the command statement. This information is transmitted to User Information and Interaction Engine 142 which forwards the parsed command to Feedback Linker and Command Dispatcher 144. This information is then forwarded to appliances, applications, and services in Storage and Execution Environment 110 for execution (FIG. 1). The execution engine at 148 will then engage the target application or service associated with the object or feature of interest and this causes these applications or services to behave as requested by the system user. The following is an example of the operation of the system of the present invention with respect to command parsing and execution.

The following example will be directed to a pointing-based dialing service for real estate agency. Conventionally, when exploring a neighborhood for a new home, a system user would have to find the telephone number of the agent that manages the house of interest and dial the number in order to call the agent. In the case of a pointing-based dialing service, the system user would simply point the system client device, such as a cell phone, at the real estate of interest, and hit the "Dial by pointing" button on the screen. The command statement, for example, would include a core command, e.g., "Start," the target application, e.g., "Call Agent," and the referenced object, which provides the execution engine at 148 enough information to automatically launch the call at 142. Once a call is launched, control is handed back to the system user for further handling using the user interface at 132.

According to the method of the present invention, once there is processing according to either Step 5 at 214 or Step 6 at 216, the method proceeds to Step 7 at 220. At Step 7, there is generation of system feedback and user information. The system feedback is feedback information that is generated based on a system user's input and intended to inform the system user of the success or failure at Steps 3 at 206, 4 at 210, 5 at 214, and 6 at 216.

When the object or feature of interest is identified at Step 3 with sufficient reliability, the command is executed according to Step 6 or the feedback is linked to the spatial object or feature according to Step 5, and the system user is notified about the success of the operation at Step 7. In situations when the spatial object of interest cannot be identified with sufficient reliability, system bypasses Steps 4, 5, and 6 and the system user is notified of the identification failure. In situations where there is a failure, the system server is provided with a list of likely spatial objects or features. These objects or features are displayed on a system client 106, which provides the system user with an opportunity to select the correct spatial object or feature and resubmit the request. The present invention also provides an additional option through system client 106. This option is for the system user to point at the object or feature of interest a second time and resubmit the request.

The feedback system may also be adapted to be used for educational purposes either outdoors or indoors. Typically, educational systems take user input, such as the result of a multiple choice test or other type of results, assess this feedback with respect to the correct answers, and provide appropriate feedback to the system user. The present invention is contemplated to be adapted to incorporate these types of educational systems. More specifically, the present invention may be configured such that applications which require testing system user feedback against predetermined values may be implemented. As an example, a professor may decide to take his/her class on a field trip to a historic site or museum. Instead of going back to the classroom to examine the students, he/she may want to test their knowledge in the field. The feedback system of the present invention can implement this type of educational activity and provides all of the components required to set up the system for this specific purpose.

It is understood that the elements of the systems of the present invention may be connected electronically by wired or wireless connections and still be within the scope of the present invention.

The embodiments or portions thereof of the system and method of the present invention may be implemented in computer hardware, firmware, and/or computer programs executing on programmable computers or servers that each includes a processor and a storage medium readable by the processor (including volatile and non-volatile memory and/or storage elements). Any computer program may be implemented in a high-level procedural or object-oriented programming language to communicate within and outside of computer-based systems.

Any computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the embodiments. The embodiments or portions thereof, may also be implemented as a machine-readable storage medium, configured with a computer program, where, upon execution, instructions in the computer program cause a machine to operate to perform the functions of the embodiments described above.

The embodiments or portions thereof, of the system and method of the present invention described above may be used in a variety of applications. Although the embodiments, or portions thereof, are not limited in this respect, the embodiments, or portions thereof, may be implemented with memory devices in microcontrollers, general purpose microprocessors, digital signal processors (DSPs), reduced instruction-set computing (RISC), and complex instruction-set computing (CISC), among other electronic components. Moreover, the embodiments, or portions thereof, described above may also be implemented using integrated circuit blocks referred to as main memory, cache memory, or other types of memory that store electronic instructions to be executed by a microprocessor or store data that may be used in arithmetic operations.

The descriptions are applicable in any computing or processing environment. The embodiments, or portions thereof, may be implemented in hardware, software, or a combination of the two. For example, the embodiments, or portions thereof, may be implemented using circuitry, such as one or more of programmable logic (e.g., an ASIC), logic gates, a processor, and a memory.

Various modifications to the disclosed embodiments will be apparent to those skilled in the art, and the general principals set forth below may be applied to other embodiments and applications. Thus, the present invention is not intended to be limited to the embodiments shown or described herein.

The invention claimed is:

1. A computer-implemented method for identifying an object in a real-world scene by pointing at the object with an electronic pointing device and electronically attaching feedback to the object in a digital representation of the object stored in system storage, comprising the steps of:
   (A) mapping a three-dimensional representation of the real-world scene containing at least one object and transmitting the three-dimensional representation to a system server;
   (B) inputting feedback relating to the at least one object to the pointing device;
   (C) inputting command statements relating to the at least one object to the pointing device;
   (D) generating a request at the pointing device that includes at least the feedback and/or command statements, and transmitting the request to the system server along with a pointing device geodetic position and pointing direction; and
   (E) the system server performing the Substeps of,
      (1) generating a two-dimensional digital representation of the three-dimensional scene mapped at Step (A), with the two-dimensional digital representation including at least a digital representation of the at least one object,
      (2) identifying the at least one object according to the pointing device geodetic position and pointing direction applied to the two-dimensional digital representation,
      (3) processing the request and separating command statements and feedback from the request,
      (4) if the request includes only at least the command statement, executing the at least command statement and then performing Substep (E)(6),
      (5) if the request includes only feedback, linking the feedback to the digital representation of the at least one object stored in system storage and then performing Substep (E)(7),
      (6) if the request does not include at least one command statement than (E)(7), otherwise if the request includes at least one command statement and feedback, executing the at least one command statement and linking feedback to the digital representation of the at least one object stored in system storage and then performing Substep (E)(7),
      (7) the system server communicating to the pointing device execution of at least one command statement and/or the linking of feedback.

2. The method as recited in claim 1, wherein the pointing device and system server communicate wired or wirelessly.

3. The method as recited in claim 1, wherein the pointing device geodetic position includes a position according to a latitude, longitude, elevation, pitch, and yaw of the pointing device.

4. The method as recited in claim 1, wherein the request includes context information.

5. The method as recited in claim 4, wherein the method further includes adding context information to feedback.

6. The method as recited in claim 5, wherein the method further includes retrieving feedback relating to the at least one object when the at least one object is identified as an object of interest.

7. The method as recited in claim 6, wherein retrieving feedback includes retrieving feedback linked to the least one object and stored in system storage.

8. The method as recited in claim 7, wherein retrieving feedback includes retrieving context information.

9. The method as recited in claim 1, wherein the system storage stores environmental information for generating two-dimensional representations of real-world scenes and objects contained therein according to the pointing device geodetic position and pointing direction.

10. The method as recited in claim 1, wherein command statements include commands for affecting a real-world state of the at least one object.

11. The method as recited in claim 1, wherein linking feedback includes linking feedback to a subpart of the at least one object.

12. The method as recited in claim 1, the pointing device includes a mobile device.

13. A computer-implemented method for identifying an object in a real-world scene by pointing at the object with an electronic pointing device and electronically attaching feedback information to the object in a digital representation of the object stored in system storage, comprising the steps of:
    (A) mapping a three-dimensional representation of the real-world scene containing at least one object and transmitting the three-dimensional representation to the system server;
    (B) inputting feedback relating to the at least one object to the pointing device;
    (C) generating a request at the pointing device that includes at least the feedback input at Step (B) and transmitting the request to the system server along with a geodetic pointing device position and pointing direction; and
    (D) the system server performing the Substeps of,
        (1) generating a two-dimensional digital representation of the three-dimensional scene mapped at Step (A), with the two-dimensional digital representation including at least a digital representation of the at least one object,
        (2) identifying the at least one object according to the pointing device geodetic position and pointing direction applied to the two-dimensional digital representation,
        (3) linking the feedback to the digital representation of the at least one object stored in system server, and
        (4) the system server communicating to the pointing device the linking of feedback.

14. The method as recited in claim 13, wherein the pointing device and system server communicate wired or wirelessly.

15. The method as recited in claim 13, wherein the pointing device geodetic position includes a position according to a latitude, longitude, elevation, pitch, and yaw of the pointing device.

16. The method as recited in claim 13, wherein the request includes context information.

17. The method as recited in claim 16, wherein the method further includes adding context information to feedback.

18. The method as recited in claim 17, wherein the method further includes retrieving feedback relating to the at least one object when the at least one object is identified as an object of interest.

19. The method as recited in claim 18, wherein retrieving feedback includes retrieving at least feedback linked to the least one object and stored in the system storage.

20. The method as recited in claim 19, wherein retrieving feedback includes retrieving context information.

21. The method as recited in claim 13, wherein the system storage stores environmental information for generating two-dimensional representations of real-world scenes and objects contained therein according to the pointing device geodetic position and pointing direction.

22. The method as recited in claim 13, wherein linking feedback includes linking feedback to a subpart of the at least one object.

23. The method as recited in claim 13, the pointing device includes a mobile device.

24. A system for identifying and attaching feedback to an object in a real-world scene, comprising,
    (A) a pointing device for pointing at an object of interest in a real-world scene and having input therein feedback and/or command statements with respect to the object of interest, with the pointing device determining a pointing device geodetic position and pointing direction, and generating a request including feedback and/or command statements, and communicating the request and pointing device geodetic position and pointing direction to a system server;
    (B) the system server further comprising,
        (1) a mapping module for receiving and processing a three-dimensional representation that contains the real-world scene including the object of interest,
        (2) a scene generator that connects to the mapping module and receives an output from the mapping module for generating a two-dimensional digital representation of the real-world scene including the object of interest and identifies the object of interest according to the pointing device geodetic position and pointing direction applied to the two-dimensional digital representation,
        (3) a linker module for linking feedback from the request to the digital representation of the object of interest stored in system storage,
        (4) a command parser module for parsing command statements from the request,
        (5) a communications module for receiving requests, and the pointing device geodetic position and pointing direction from the pointing device, and transmitting at least retrieved feedback and/or command statement execution status to the pointing device; and
    (C) system storage in communication with the system server for storing feedback relating to objects, including the object of interest, and two-dimensional digital environment information relating to the real-world scene containing objects, including the object interest; and
    (D) an execution module in communications with the system server for executing command statements that affect a real-world state of the object of interest or subpart of the object of interest.

25. The system as recited in claim 24, wherein the pointing device includes a mobile device.

26. The system as recited in claim 24, wherein system storage includes system databases.

27. The system as recited in claim 24, wherein the execution module executes commands associated with appliances, applications, or services.

28. The system as recited in claim 24, wherein the system server and pointing device communicates wired or wirelessly.

* * * * *